(12) United States Patent
Tsorng et al.

(10) Patent No.: US 11,855,432 B2
(45) Date of Patent: Dec. 26, 2023

(54) CABLE MANAGEMENT BRACKETS

(71) Applicant: QUANTA COMPUTER INC., Taoyuan (TW)

(72) Inventors: Yaw-Tzorng Tsorng, Taoyuan (TW); Ming-Lung Wang, Taoyuan (TW); Jia-Lin Liu, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 55 days.

(21) Appl. No.: 17/462,845

(22) Filed: Aug. 31, 2021

(65) Prior Publication Data

US 2023/0068449 A1 Mar. 2, 2023

(51) Int. Cl.
*H02G 3/32* (2006.01)
*F16L 3/223* (2006.01)
*F16L 3/10* (2006.01)

(52) U.S. Cl.
CPC ............ *H02G 3/32* (2013.01); *F16L 3/1058* (2013.01); *F16L 3/2235* (2013.01)

(58) Field of Classification Search
CPC ......... H02G 3/32; F16L 3/1058; F16L 3/2235
USPC ........................................................ 248/249
See application file for complete search history.

(56) References Cited

U.S. PATENT DOCUMENTS

| 6,345,873 | B1* | 2/2002 | Kim ................... F16L 3/223 248/68.1 |
| 10,391,190 | B1* | 8/2019 | Oko .................. F16B 5/0614 |
| 2005/0068250 | A1* | 3/2005 | Cornec ................ H02G 3/32 343/702 |
| 2016/0178089 | A1* | 6/2016 | Yadav ............... B60R 16/0215 248/74.2 |
| 2021/0353050 | A1* | 11/2021 | Egger .................. F16M 11/22 |

* cited by examiner

*Primary Examiner* — Muhammad Ijaz
(74) *Attorney, Agent, or Firm* — NIXON PEABODY LLP

(57) ABSTRACT

A cable management bracket including a cable management base, one or more cable clamps, and a cable distribution block is disclosed. The cable management base has a base panel, and a first sidewall and a second sidewall between a front end and a rear end of the base panel. The first sidewall and the second sidewall extend from and along opposite sides of the base panel. The one or more cable clamps are disposed on the base panel. Each cable clamp has two opposing arms separated by a slot. Each of the two opposing arms are flexibly movable to accommodate a cable in the slot. The cable distribution block is disposed at the rear end of the base panel. The cable distribution block has a plurality of through holes, each through hole configured to accommodate the cable through an opening that is flexibly movable in a horizontal direction.

20 Claims, 7 Drawing Sheets

CABLE MANAGEMENT BRACKETS

FIELD OF THE INVENTION

The present invention relates generally to management of cables in an electronic chassis, and more specifically, to cable management brackets for routing cables within electronic chassis.

BACKGROUND OF THE INVENTION

Advancements in 5G technology have led to the growth of networks that require several interconnected devices having electronic chassis for receiving cables. The electronic chassis include electronic components that are connected through cables to other components, such as 5G Central Units (CU), distributed units (DU), Remote Radio Units (RRU), Active Antenna Units (AAU), and Radio Units (RU). These cables may have different sizes and different lengths. Without an organized way of aligning and routing the cables, the cables form clusters within the electronic chassis and become difficult to manage as they pass through the different electronic components in the electronic chassis. Accordingly, it is desirable to have an in-situ component in the electronic chassis for managing and routing the cables that connect the different electronic components in the electronic chassis.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a cable management bracket is disclosed. The cable management bracket includes a cable management base, one or more cable clamps, and a cable distribution block. The cable management base has a base panel, and a first sidewall and a second sidewall between a front end and a rear end of the base panel. The first sidewall and the second sidewall extend from and along opposite sides of the base panel. The one or more cable clamps are disposed on the base panel. Each cable clamp has two opposing arms separated by a slot. Each of the two opposing arms are flexibly movable to accommodate a cable in the slot. The cable distribution block is disposed at the rear end of the base panel. The cable distribution block has a plurality of through holes, each through hole configured to accommodate the cable through an opening that is flexibly movable in a horizontal direction.

According to certain aspects of the present disclosure, the two opposing arms of each cable clamp are flexibly movable in a horizontal direction.

According to certain aspects of the present disclosure, the one or more cable clamps include one or more rows of cable clamps disposed on the base panel, wherein each row of cable clamps being horizontally aligned with corresponding through holes of the cable distribution block.

According to certain aspects of the present disclosure, each row of cable clamps includes two or more cable clamps.

According to certain aspects of the present disclosure, the cable clamps in each row are horizontally aligned such that an inserted cable through a respective cable clamp in a first row passes through another cable clamp in a second row, the inserted cable also passing through a corresponding through hole in the cable distribution block.

According to certain aspects of the present disclosure, the cable management bracket includes two rows of three cable clamps.

According to certain aspects of the present disclosure, the cable management bracket further includes one or more cable clips disposed on at least one of the first sidewall and the second sidewall, wherein each cable clip has a cable holder extends from a clip base and the cable holder is flexibly movable to accommodate another cable in a holding area between the cable holder and the clip base.

According to certain aspects of the present disclosure, the cable holder is flexibly movable in a vertical direction.

According to certain aspects of the present disclosure, the one or more cable clips includes two cable clips disposed on each of the first sidewall and the second sidewall.

According to certain aspects of the present disclosure, each through hole of the cable distribution block is configured to accommodate the another cable through an opening that is flexibly movable in a horizontal direction.

According to certain aspects of the present disclosure, at least one of (i) the one or more cable clips, (ii) the one or more cable clamps, and (iii) the cable distribution block is made from an elastomeric material.

According to certain aspects of the present disclosure, an electronic chassis includes a first set of cables at a first height, a second set of cables at a second height, and one or more cable management brackets. The first set of cables and the second set of cables are configured to electrically connect components disposed on the electronic chassis. The second height of the second set of cables is greater than the first height of the first set of cables. Each cable management bracket includes a cable management base, one or more cable clamps, one or more cable clips, and a cable distribution block. The cable management base has a base panel, and a first sidewall and a second sidewall between a front end and a rear end of the base panel. The first sidewall and the second sidewall extend from and along opposite sides of the base panel. The one or more cable clamps are disposed on the base panel and configured to accommodate the first set of cables. Each cable clamp has two opposing arms separated by a slot. Each of the two opposing arms are flexibly movable to accommodate a cable in the slot. The one or more cable clips are disposed on at least one of the first sidewall and the second sidewall, and configured to accommodate the second set of cables. Each cable clip has a cable holder extending from a clip base. The cable holder is flexibly movable to accommodate another cable in a holding area between the cable holder and the clip base. The cable distribution block is disposed at the rear end of the base panel. The cable distribution block has a plurality of through holes. Each through hole is configured to accommodate the cable through each of the one or more cable clamps and the another cable through each of the one or more cable clips via an opening that is flexibly movable in a horizontal direction.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

Figure 1:
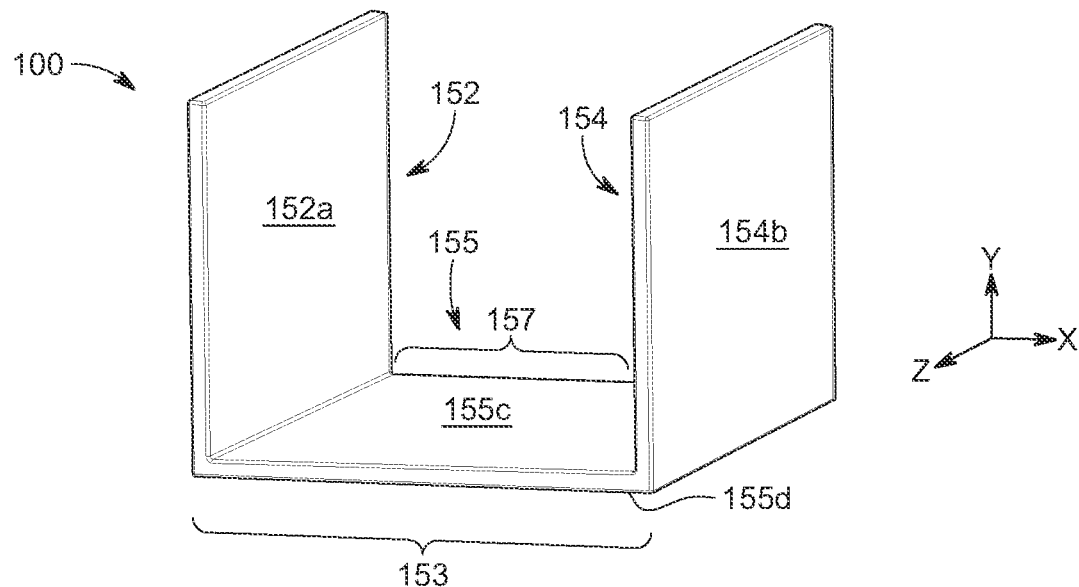
FIG. 1 shows a perspective view of a cable management base having a base panel bounded by a first sidewall and a second sidewall extending from and along opposite sides of the base panel, and used in a cable management bracket, according to certain aspects of the present disclosure.

The present disclosure is susceptible to various modifications and alternative forms, and some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

Embodiments of the disclosure are directed to a cable management bracket having one or more cable clamps, one or more cable clips, and a cable distribution block. Cables connecting with electronic components at different heights over an electronic chassis are passed through flexibly-movable openings in the cable clamps and the cable clips, and then aligned at the same level, using the cable distribution block. This organizes and arranges the cables in a convenient way to easily enable any further connection of the cables.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

FIG. 1 shows a perspective view of a cable management base 100 used in a cable management bracket 500 (shown in FIG. 5). The cable management base 100 has a base panel 155 bounded by a first sidewall 152 and a second sidewall 154. In some embodiment, the base panel 155 is substantially flat and can be coupled to a horizontal surface of a chassis. The base panel 155 has a top surface 155c and a bottom surface 155d. The base panel 155 includes a coupling mechanism for attaching the cable management base 100 to an electronic chassis. In some embodiments, the coupling mechanism may be a layer of adhesive (e.g., double-sided tape) disposed on the bottom surface 155d of the base panel 155.

The base panel 155 extends between a front end 153 and a rear end 157. The first sidewall 152 and the second sidewall 154 extends between the front end 153 and the rear end 157 from and along opposite sides of the base panel 155. In the non-limiting embodiment shown in FIG. 1, the first sidewall 152 bounds the base panel 155 on the left side and the second sidewall 154 bounds the base panel 155 on the right side. The first sidewall 152 has an inner surface 152a and an outer surface 152b (not visible). The second sidewall 154 has an inner surface 154a (not visible) and an outer surface 154b. The cable management base 100 is made from a sturdy and durable material such as, but not limited to, a plastic material.

In some embodiments, the base panel 155 has a length of between about 50 mm and about 80 mm between the front end 153 and the rear end 157. For example, the base panel 155 may have a length of about 66 mm. In some embodiments, the base panel 155 has a breath of between about 30 mm and about 60 mm between the first sidewall 152 and the second sidewall 154. For example, the base panel 155 may have a breadth of about 45.5 mm. In some embodiments, the first sidewall 152 and the second sidewall 154 has a height of between about 30 mm and about 50 mm. For example, the first sidewall 152 and the second sidewall 154 may have a height of about 39 mm.

Figure 2A:
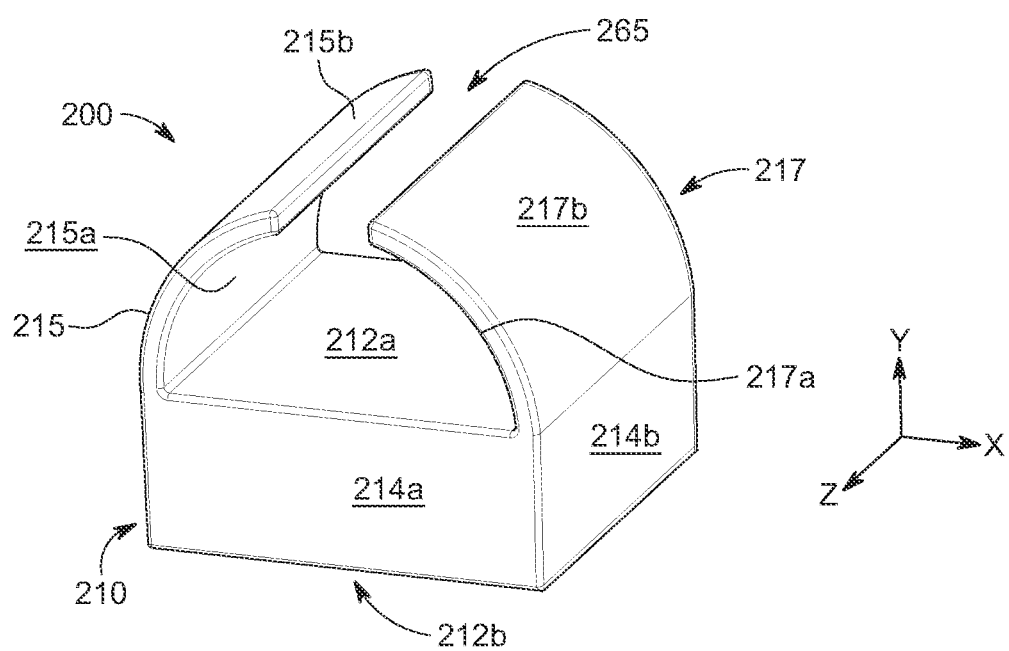
FIG. 2A shows a front perspective view of a cable clamp with a slot in a closed configuration and used in the cable management bracket, according to certain aspects of the present disclosure.
Figure 2B:
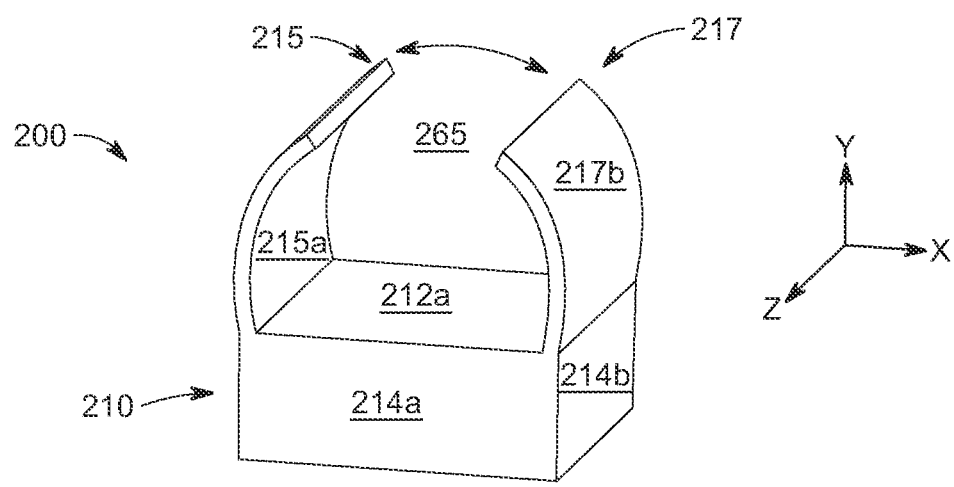
FIG. 2B shows a front perspective view of the cable clamp of FIG. 2A with the slot in an open configuration, according to certain aspects of the present disclosure.
Figure 2C:
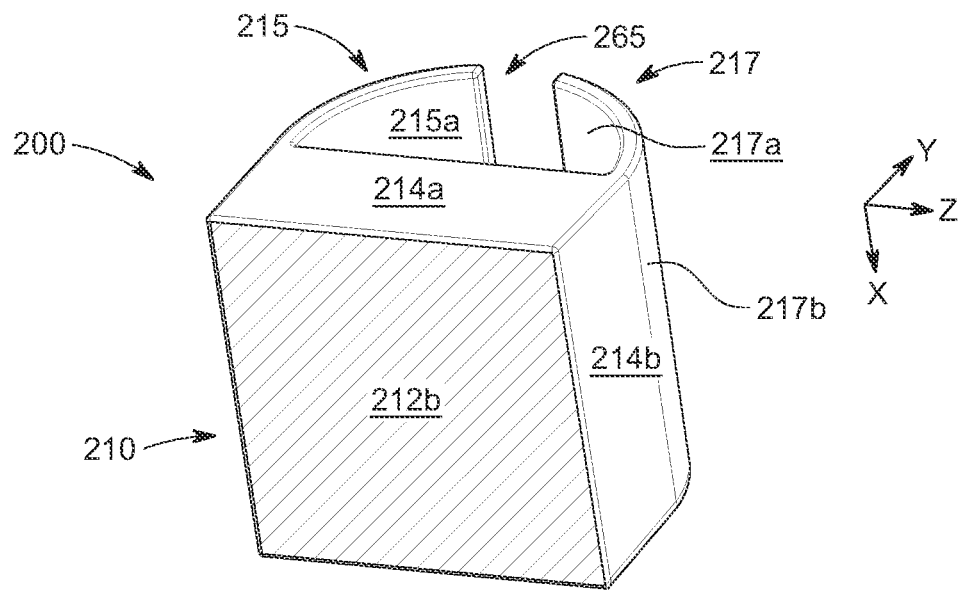
FIG. 2C shows a bottom perspective view of the cable clamp of FIG. 2A with the slot in the closed configuration, according to certain aspects of the present disclosure.

FIGS. 2A-2B show front perspective views of a cable clamp 200 with a slot 265 in a closed configuration and open configuration, respectively, and used in the cable management bracket 500 (shown in FIG. 5). FIG. 2C shows a bottom perspective view of the cable clamp 200 with a slot 265 in the closed configuration. The cable clamp 200 is made from an elastomeric material such as, but not limited to, rubber. The cable clamp 200 has a central block 210. While the central block 210 in FIGS. 2A-2C is cuboidal in shape, it is contemplated that the central block 210 could be shaped as a disk, a rectangular strip, etc. having a flat top surface. The central block 210 of FIG. 2 has a top surface 212a, a bottom surface 212b, and four side surfaces 214a, 214b, 214c (not visible), and 214d (not visible). The central block 210 includes a coupling mechanism for attaching the cable clamp 200 to an electronic chassis. In some embodiments, the coupling mechanism may be a layer of adhesive (e.g., double-sided tape) disposed on the bottom surface 212b of the central block 210.

The cable clamp 200 includes a first arm 215 and a second opposing arm 217 separated by the slot 265. The first arm 215 is disposed on the left side, and has an inner surface 215a and an outer surface 215b. The second opposing arm 217 is disposed on the right side, and has an inner surface 217a and an outer surface 217b. Each of the first arm 215 and the second opposing arm 217 are flexibly movable to accommodate a cable in the slot 265. In the non-limiting embodiment shown in FIGS. 2A-2C, the two opposing arms 215, 217 flexibly move in a horizontal direction (along the X-axis) upon application of a force that spreads the first arm 215 and the second opposing arm 217 apart and open the slot 265. A cable having an outer diameter less than about 4 mm and a bending radius greater than about 40 mm can be accommodated within the slot 265 when forced open. The force may be applied by hand or by a downward pressure of the cable being accommodated in the slot 265. Once the cable is placed in the slot 265, the first arm 215 and the second opposing arm 217 move back towards each other into the closed configuration. This ensures that the cable is secured within the slot 265.

In some embodiments, the central block 210 of the cable clamp 200 has a length between about 3 mm and about 6 mm, and a breadth between about 3mm and about 6 mm. For example, the central block 210 may have a length of about 4.8 mm and a breadth of about 4.8 mm. In some embodiments, the slot 265 between the first arm 215 and the second opposing arm 217 has a width of between about 0.5 mm in the closed configuration, and about 7 mm in the open configuration. For example, the slot 265 may open between about 1 mm to about 5 mm to accommodate a cable therein when the two opposing arms 215, 217 are moved apart.

Figure 3A:
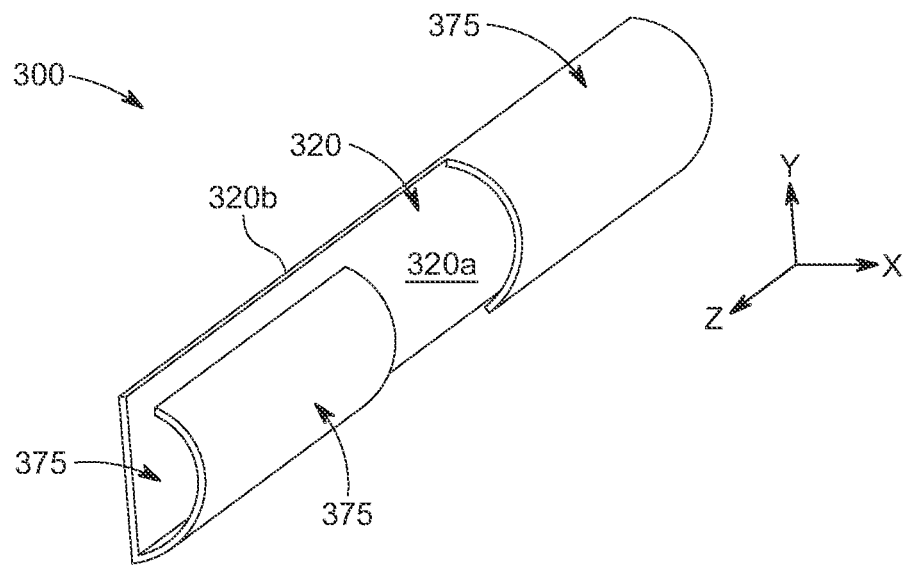
FIG. 3A shows a front perspective view of a cable clip with two cable holders and used in the cable management bracket, according to certain aspects of the present disclosure.
Figure 3B:
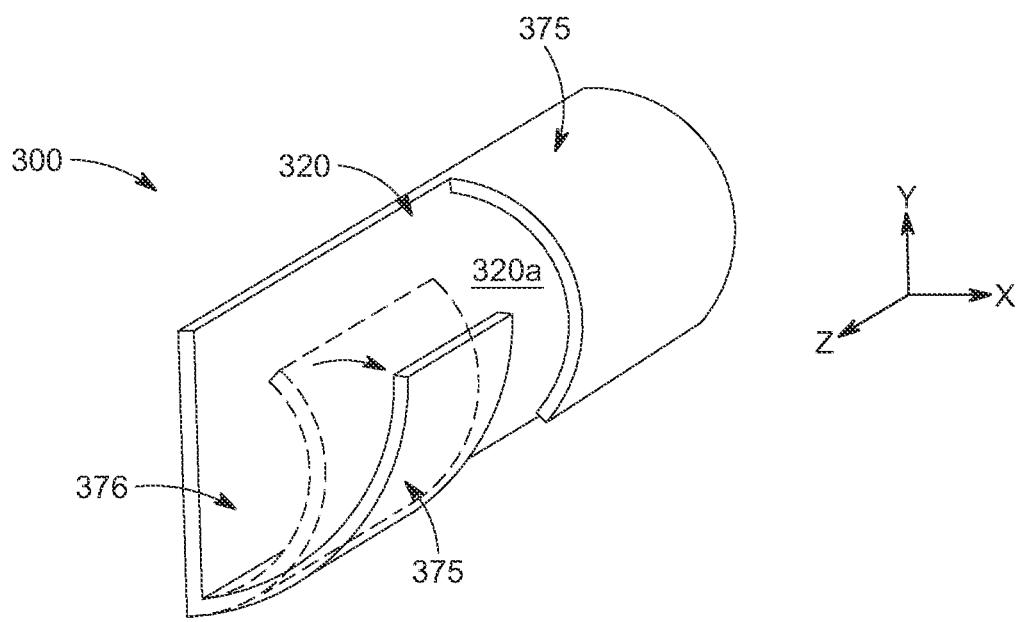
FIG. 3B shows a front perspective view of the cable clip of FIG. 3A with one of the cable holders in an open configuration, according to certain aspects of the present disclosure.
Figure 3C:
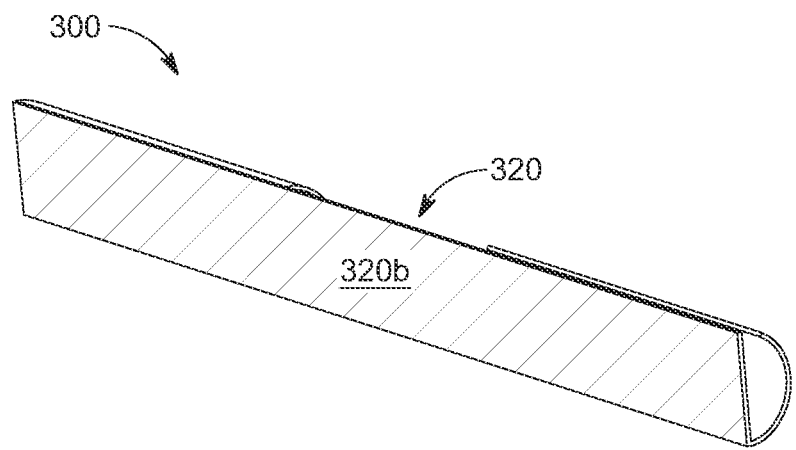
FIG. 3C shows a rear perspective view of the cable clip of FIG. 3A, according to certain aspects of the present disclosure.

FIGS. 3A-3B shows a front perspective views of a cable clip 300 used in the cable management bracket 500 (shown in FIG. 5) in closed and open configurations, respectively, while FIG. 3C shows a rear perspective view of the cable clip 300. As described further below with respect to FIGS. 5-7, one or more cable clips 300 may be disposed on the first sidewall 152 (FIG. 1) and the second sidewall 154 (FIG. 1) of the cable management base 100 (FIG. 1) in the cable management bracket 500. The cable clip 300 is made from an elastomeric material such as, but not limited to, rubber. The cable clip 300 has a clip base 320 having a front surface 320a and a rear surface 320b. While the clip base 320 in FIGS. 3A-3C is shaped as a rectangular strip, it is contemplated that the clip base 320 could be shaped as a disk, a cuboidal block, etc., having flat front and rear surfaces. The clip base 320 includes a coupling mechanism for attaching the cable clip 300 to an electronic chassis. In some embodiments, the coupling mechanism may be a layer of adhesive (e.g., double-sided tape) disposed on the rear surface 320b of the clip base 320.

The cable clip 300 includes one or more cable holders 375 extending from the clip base 320. The cable holder 375 is configured to flexibly move in a vertical direction (along the Y-axis), upon application of a force that widens a holding area 376 formed by the cable holder 375 with the clip base 320 for accommodating a cable therein. In the embodiment shown in FIGS. 3A-3B, the cable holder 375 has a hemispherical shape with an outer radius between about 1 mm and about 3 mm. For example, the outer radius of the cable holder 375 may be about 2 mm. A cable having an outer diameter less than about 4 mm and a bending radius greater than about 40 mm can be accommodated within the holding area 376, when forced open. The force may be applied by hand or by a downward pressure of the cable being accommodated in the holding area 376. Once the cable is placed in the holding area 376, the cable holder 375 moves back into the closed configuration. This ensures that the cable is secured within the holding area 376. The cable clip 300 is used wherever cables of different heights have to be maintained at the same height, i.e. aligned at the same height.

In some embodiments, the clip base 320 of the cable clip 300 has a length of between about 15 mm and about 35 mm, and a height of between about 2 mm and about 6 mm. For example, the clip base 320 may have a length of about 25 mm and a height of about 4 mm. Further, in some embodiments, the cable holder 375 forming the holding area 376 may flexibly move apart by a distance between about 0.4 mm and about 5 mm to accommodate a cable in the holding area 376. For example, the cable holder 375 may flexibly move apart by a distance of between about 0.6 mm and about 4.5 mm.

Figure 4:
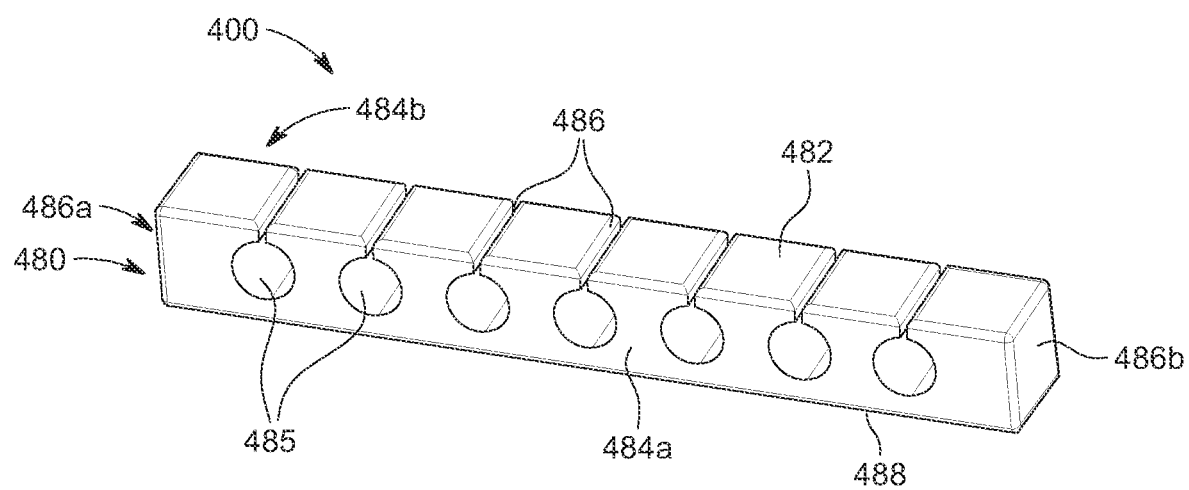
FIG. 4 shows a front perspective view of a cable distribution block used in the cable management block, according to certain aspects of the present disclosure.

FIG. 4 shows a front perspective view of a cable distribution block 400 used in the cable management bracket 500 (shown in FIG. 5). As described further below with respect to FIGS. 5-7, the cable distribution block 400 is disposed, for example, at or adjacent to the rear end 157 (FIG. 1) of the base panel 155 (FIG. 1) between the first sidewall 152 (FIG. 1) and the second sidewall 154 (FIG. 1) of the cable management bracket 500. The cable distribution block 400 is made from an elastomeric material such as, but not limited to rubber.

The cable distribution block 400 includes a top surface 482, a front surface 484a, a rear surface 484b, two side surfaces 486a and 486b, and a bottom surface 488. The cable distribution block 400 includes a coupling mechanism for attaching to an electronic chassis. In some embodiments, the coupling mechanism may be a layer of adhesive (e.g., double-sided tape) disposed on the bottom surface 488.

The cable distribution block 400 includes a plurality of through holes 485 between the front surface 484a and the rear surface 484b. Each through hole 485 is accessible through an opening 486 on the top surface 482 and configured to route a cable therethrough. Each opening 486 is configured to flexibly move apart in a horizontal direction (along the X axis) upon application of a force that widens the opening 486. The force may be applied by hand or by a downward pressure of the cable being routed through the through hole 485. Once the cable is placed in the through hole 485, the opening 486 moves back into the closed configuration. This ensures that the cable is secured within the through hole 485. In some embodiments, the cable distribution block 400 has a length between about 30 mm and about 60 mm, a breadth between about 3 mm and about 6 mm, and a height between about 3 mm and about 6 mm. For example, the cable distribution block 400 may have a length of about 40 mm, a width of about 5 mm, and a height of about 5 mm. Further, in some embodiments, the cable distribution block 400 has between about four and twenty through holes 485. For example, the cable distribution block 400 may have seven through holes 485, as shown in FIG. 4. In some embodiments, the diameter of the through holes 485 is between about 2 mm and about 6 mm. For example, the diameter of the through holes 485 may be about 3 mm. Further, in some embodiments, the openings 486 on the top surface 482 may flexibly move by a distance between about 0.4 mm and about 6 mm to accommodate a cable in the through hole 485. For example, the opening 486 may flexibly move by a distance between about 1 mm and about 4.5 mm.

Figure 5A:
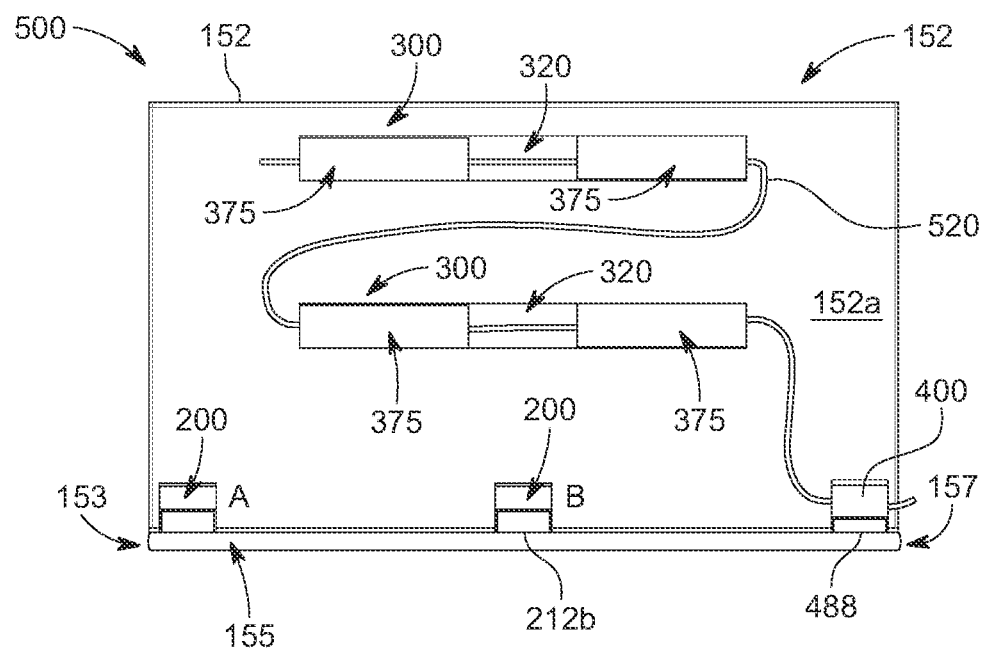
FIG. 5A shows a side view of the interior of the cable management bracket, according to certain aspects of the present disclosure.
Figure 5B:
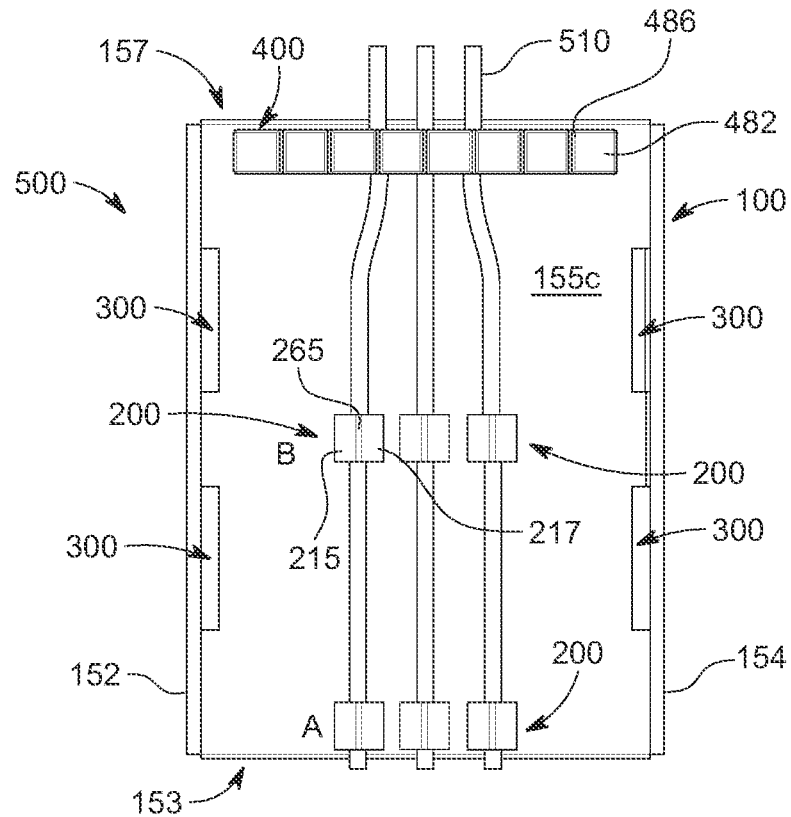
FIG. 5B shows a top view of the interior of the cable management bracket, according to certain aspects of the present disclosure.

FIGS. 5A-5B show a side view and a top view, respectively, of the interior of the cable management bracket 500. The cable management bracket 500 includes one or more rows of the cable clamps 200 disposed on the base panel 155; one or more the cable clips 300 disposed on the first sidewall 152 and the second sidewall 154; and the cable distribution block 400 disposed at the rear end 157 of the base panel 155. The cable clamps 200 are attached to the top surface 155c of the base panel 155 via a coupling mechanism such as a layer of adhesive (e.g., double-sided tape) disposed on the bottom surface 212b of the central block 210 of each cable clamp 200. The cable clips 300 are attached to the inner surfaces 152a and 154a (FIG. 1) of the first sidewall 152 and the second sidewall 154, respectively, via a coupling mechanism such as a layer of adhesive (e.g., double-sided tape) disposed on the rear surface 320b (FIG. 3C) of the clip base 320 of each cable clip 300. The cable distribution block 400 is attached to the top surface 155c of the base panel 155 via a coupling mechanism such as a layer of adhesive (e.g., double-sided tape) disposed on the bottom surface 488 of the cable distribution block 400.

In the embodiment shown in FIGS. 5A-5B, there are two rows of cable clamps 200, a first row A near the front end 153 of the base panel 155 and a second row B in a central portion of the base panel 155. It is contemplated that in other embodiments, there may be three or more rows of cable clamps 200. Each row of cable clamps 200 is horizontally aligned with corresponding through holes 485 in the cable distribution block 400.

Each row A, B of cable clamps 200 includes two or more cable clamps 200. In the embodiment shown in FIGS. 5A-5B, there are three cable clamps 200 in each of the rows A and B. The cable clamps 200 in each of the rows A, B are horizontally aligned such that an inserted cable 510 through a respective cable clamp 200 in row A passes through another cable clamp 200 in row B and a corresponding through hole 485 in the cable distribution block 400.

Additionally, in the embodiment shown in FIGS. 5A-5B, the cable management bracket 500 includes two cable clips 300 disposed on each of the first sidewall 152 and the second sidewall 154. The two cable clips 300 are arranged vertically with respect to each other. The two cable clips 300 may accommodate one or more cables 520 positioned higher than the cable 510 through the cable clamps 200. The cable clips 300 may accommodate the cables 520 individually, or together such that the same cable 520 passes through both the cable clips 300 in a zigzag fashion, as shown in FIGS. 5A-5B. The cable(s) 520 passing through the cable clamps 200 and the cable(s) 510 passing through the cable clips 300 are both routed through the through holes 485 of the cable distribution block 400.

Figure 6:
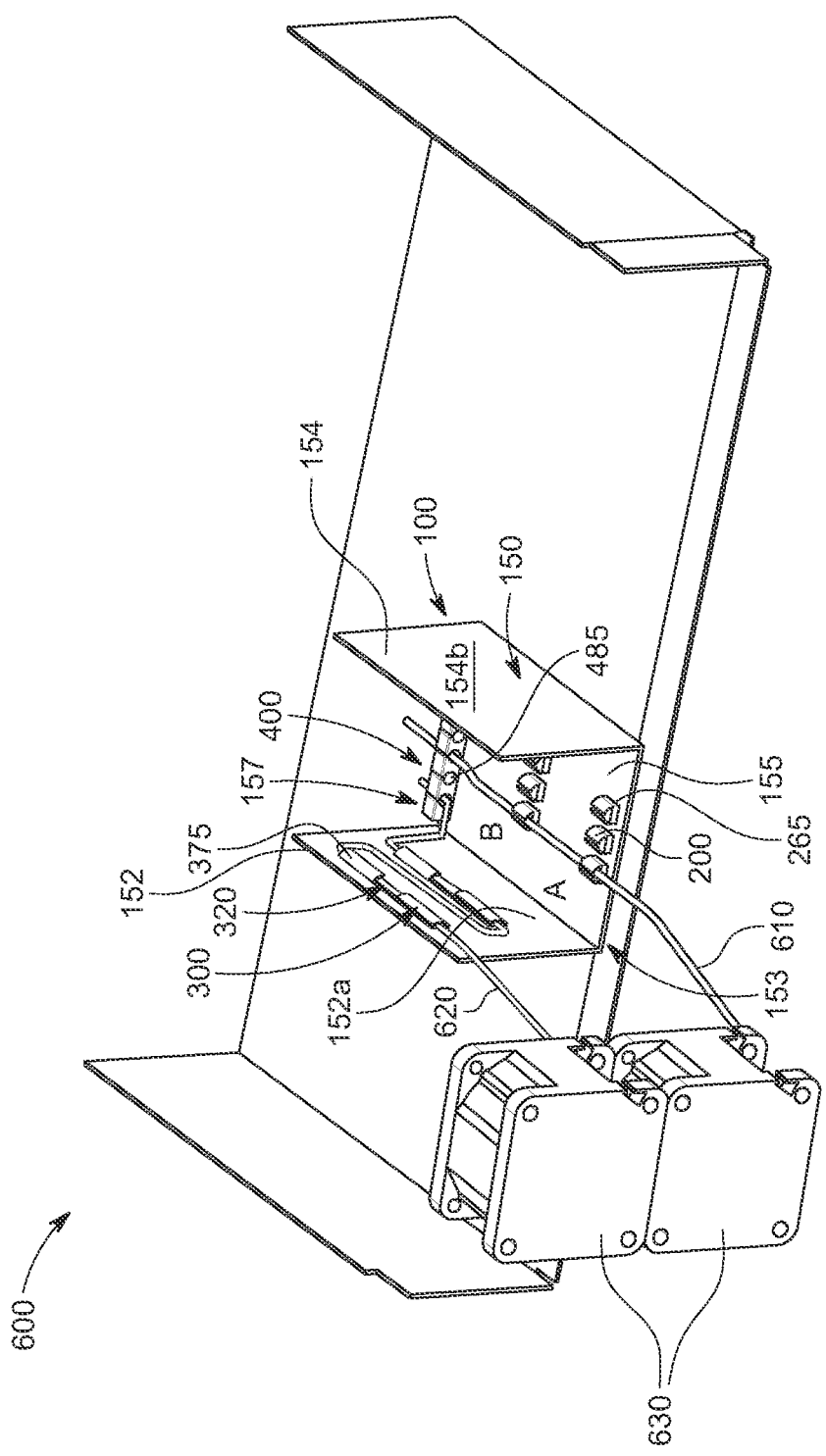
FIG. 6 shows a front perspective view of an electronic chassis having cables of different height routed through the cable management bracket, according to certain aspects of the present disclosure.

FIG. 6 shows a front perspective view of an electronic chassis 600 having cables of different height routed through the cable management bracket 500. The cable management bracket 500 is attached to the electronic chassis 600 via a coupling mechanism such as a layer of adhesive (e.g., double-sided tape) on the bottom surface 155d (FIG. 1) of the base panel 155. The electronic chassis 600 may belong to an electronic product or a computing device such as, but not limited to, a server. The electronic chassis 600 includes a first cable 610 at a first height proximal to the base panel 155 and a second cable 620 at a second much-greater height from the base panel 155 than the first height of the cable 610. In some embodiments, there may be multiple cables 610 forming a first set of cables at a first height, as well as multiple cables 620 forming a second set of cables at a second height, where the second height is greater than the first height. The cables 610, 620 are configured to connect components 630 disposed on or adjacent to the electronic chassis 600. The components 630 may be electronic components such as power supply devices, controllers, etc., or mechanical components such as fans, connectors, etc. In the embodiment shown in FIG. 6, the components 630 are vertically stacked over each other, such that the cables 610, 620 coming from the components 630 have different heights.

As shown in FIG. 6, the cable 610 at the first height proximal to the base panel 155 is passed through corresponding cable clamps 200 in rows A, B by pressing the cable 610 downward to move the first arm 215 (FIGS. 2A-2B) and the second opposing arm 217 (FIGS. 2A-2B) of each cable clamp 200 apart and securing the cable 610 in a slot 265 therein. The cable 610 is then routed through a corresponding through hole 485 of the cable distribution block 400 by pressing the cable 610 downward against a corresponding opening 486 (FIG. 4) of the through hole 485 and securing the cable 610 therein.

Further, as shown in FIG. 6, the cable 620 at the second much-greater height is passed through the two cable clips 300 arranged vertically by pressing the cable 620 downward against the cable holder 375 and securing the cable 620 in the holding area 376 (FIG. 3B) of each of the two cable clips 300. The cable 620 is then routed through a corresponding through hole 485 of the cable distribution block 400 by pressing the cable 620 downward against a corresponding opening 486 of the through hole 485 and securing the cable 620 therein. Thus, the cables 610 and 620 of different heights are conveniently aligned in height by the cable management bracket 500 and organized in a linear fashion to easily enable further connection.

Figure 7:
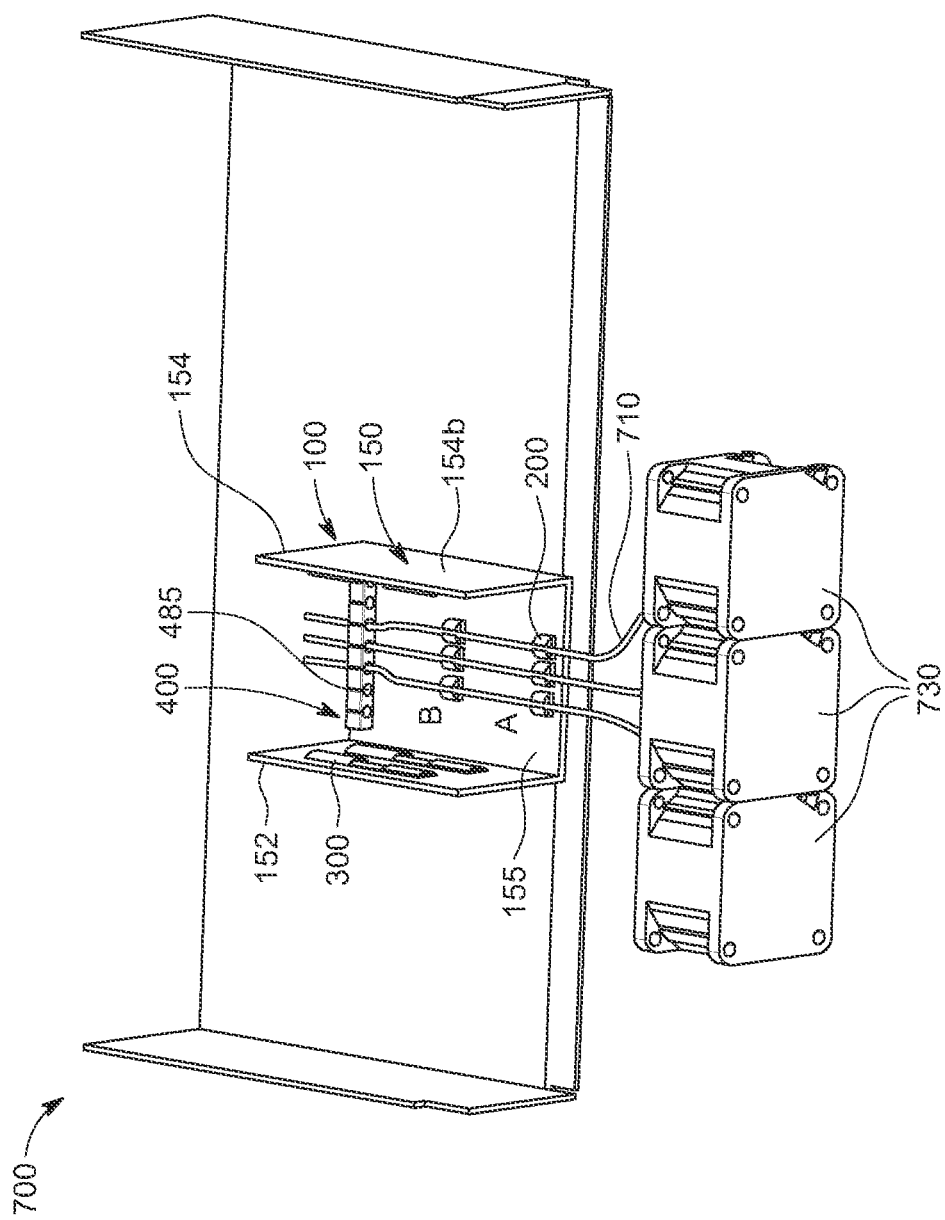
FIG. 7 shows a front perspective view of an electronic chassis having cables of same height routed through the cable management bracket, according to certain aspects of the present disclosure.

FIG. 7 shows a front perspective view of an electronic chassis 700 having cables of same height routed through the cable management bracket 500. The electronic chassis 700 is substantially similar to the electronic chassis 600, except that a set of three cables 710 having the same height are connected to components 730 that are laterally disposed. While only three cables are shown in the embodiment of FIG. 7, it is contemplated that there may be any number of cables 710 of same height in the set. The components 730 may be electronic components such as power supply devices, controllers, etc., or mechanical components such as fans, connectors, etc.

As shown in FIG. 7, the three cables 710 are passed through three cable clamps 200 in each of the rows A, B by pressing each cable 710 downward to move apart the first arm 215 (FIGS. 2A-2B) and the second opposing arm 217 (FIGS. 2A-2B) of each cable clamp 200, and securing each cable 710 therein. Each of the three cables 710 is then routed through a corresponding through hole 485 of the cable distribution block 400 by pressing each cable 710 downward against a corresponding opening 486 (FIG. 4) of the through hole 485, and securing the cable 710 therein. In the embodiment shown in FIG. 7, the cable clips 300 remain unused. Regardless, the cables 710 are conveniently arranged by the cable management bracket 500 and organized in a linear fashion to easily enable further connection.

Advantageously, the cable management bracket, as described herein, provides a flexible space for accommodating and routing cables of different sizes that enter an electronic chassis at different heights. The cable management bracket provides an organized arrangement of the cables that easily enables further connection such as in servers and electronic products, without creating knots and staggering of the cables.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure.

Thus, the breadth and scope of the present disclosure should not be limited by any of the above described embodiments. Rather, the scope of the disclosure should be defined in accordance with the following claims and their equivalents.

What is claimed is:

1. A cable management bracket comprising:
a cable management base having a base panel, a first sidewall and a second sidewall between a front end and a rear end of the base panel, the first sidewall and the second sidewall extending from and along opposite sides of the base panel;
one or more cable clamps disposed on the base panel, each cable clamp having two opposing arms separated by a slot, each of the two opposing arms being flexibly movable to accommodate a cable in the slot; and
a cable distribution block disposed at the rear end of the base panel, the cable distribution block having a plurality of through holes, each through hole configured to accommodate the cable through an opening that is flexibly movable in a horizontal direction.

2. The cable management bracket of claim 1, wherein the two opposing arms are flexibly movable in a horizontal direction.

3. The cable management bracket of claim 1, wherein the one or more cable clamps include one or more rows of cable clamps disposed on the base panel, each row of the one or more rows of cable clamps being horizontally aligned with respective through holes of the cable distribution block.

4. The cable management bracket of claim 3, wherein each row of the one or more rows of cable clamps includes two or more cable clamps.

5. The cable management bracket of claim 3, wherein the one or more cable clamps in each row of the one or more rows of cable clamps are horizontally aligned such that an inserted cable through a respective cable clamp in a first row passes through another cable clamp in a second row, the inserted cable also passing through a respective through hole in the cable distribution block.

6. The cable management bracket of claim 3 comprising two rows of three cable clamps.

7. The cable management bracket of claim 1, further comprising one or more cable clips disposed on at least one of the first sidewall and the second sidewall, each cable clip having a cable holder extending from a clip base, the cable holder being flexibly movable to accommodate another cable in a holding area between the cable holder and the clip base.

8. The cable management bracket of claim 7, wherein the cable holder is flexibly movable in a vertical direction.

9. The cable management bracket of claim 7, wherein the one or more cable clips includes two cable clips disposed on each of the first sidewall and the second sidewall.

10. The cable management bracket of claim 7, wherein each through hole is configured to accommodate the another cable through an opening that is flexibly movable in a horizontal direction.

11. The cable management bracket of claim 7, wherein at least one of (i) the one or more cable clips, (ii) the one or more cable clamps, and (iii) the cable distribution block is made from an elastomeric material.

12. An electronic chassis comprising:
a first set of cables at a first height and a second set of cables at a second height, the first set of cables and the second set of cables configured to electrically connect components disposed on the electronic chassis, wherein the second height is greater than the first height; and one or more cable management brackets, each cable management bracket comprising:
- a cable management base having a base panel, a first sidewall and a second sidewall between a front end and a rear end of the base panel, the first sidewall and the second sidewall extending from and along opposite sides of the base panel;
- one or more cable clamps disposed on the base panel and configured to accommodate the first set of cables, each cable clamp having two opposing arms separated by a slot, each of the two opposing arms being flexibly movable to accommodate a cable in the slot;
- one or more cable clips disposed on at least one of the first sidewall and the second sidewall and configured to accommodate the second set of cables, each cable clip having a cable holder extending from a clip base, the cable holder being flexibly movable to accommodate another cable in a holding area between the cable holder and the clip base; and
- a cable distribution block disposed at the rear end of the base panel, the cable distribution block having a plurality of through holes, each through hole configured to accommodate the cable through each of the one or more cable clamps and the another cable through each of the one or more cable clips via an opening that is flexibly movable in a horizontal direction.

13. The electronic chassis of claim 12, wherein the two opposing arms of each cable clamp are flexibly movable in a horizontal direction.

14. The electronic chassis of claim 12, wherein the one or more cable clamps include one or more rows of cable clamps disposed on the base panel, each row of the one or more rows of cable clamps being horizontally aligned with respective through holes of the cable distribution block.

15. The electronic chassis of claim 14, wherein each row of the one or more rows of cable clamps includes two or more cable clamps.

16. The electronic chassis of claim 14, wherein the one or more cable clamps in each row of the one or more rows of cable clamps are horizontally aligned such that an inserted cable through a respective cable clamp in a first row passes through another cable clamp in a second row, the inserted cable also passing through a respective through hole in the cable distribution block.

17. The electronic chassis of claim 15 comprising two rows of three cable clamps.

18. The electronic chassis of claim 12, wherein the cable holder is flexibly movable in a vertical direction.

19. The electronic chassis of claim 12, wherein the one or more cable clips includes two cable clips disposed on each of the first sidewall and the second sidewall.

20. The electronic chassis of claim 12, wherein at least one of (i) the one or more cable clips, (ii) the one or more cable clamps, and (iii) the cable distribution block is made from an elastomeric material.

* * * * *